Figure 1:
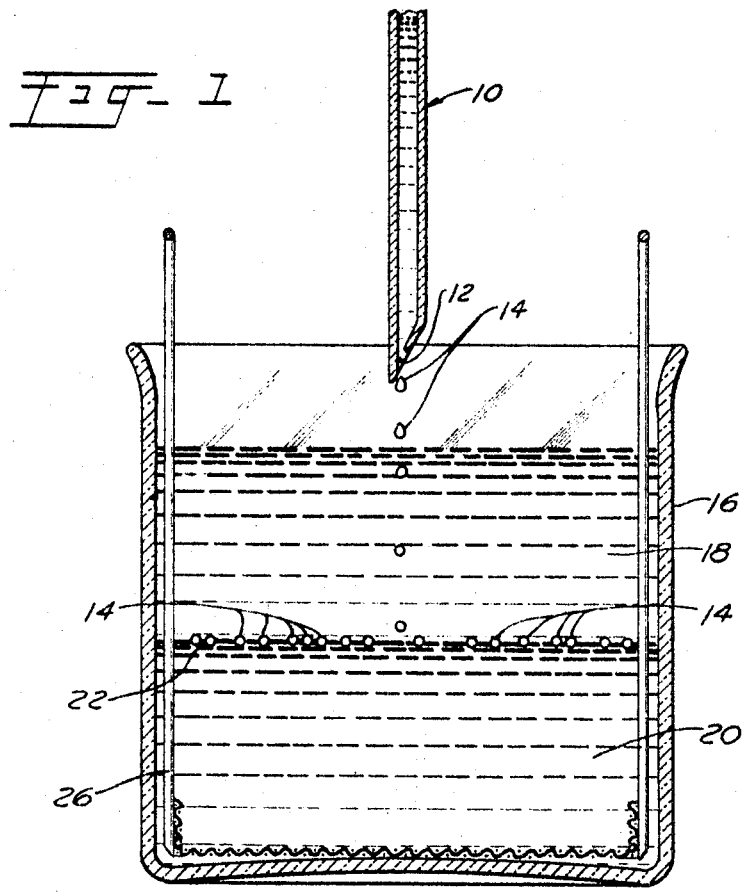

INVENTORS
ROBERT M. JOLKOVSKI
AWBREY CHARLES LAWS AND
DONALD H. POWERS
BY
Bair, Freeman & Molinare
ATTORNEYS 3,270,100
METHOD FOR MAKING CAPSULES BY INTERFACIAL POLYMERIZATION
Robert M. Jolkovski, Awbrey Charles Laws, and Donald H. Powers, Boston, Mass., assignors, by mesne assignments, of fifty percent to Delavan Manufacturing Company, West Des Moines, Iowa, a corporation of Iowa, and fifty percent to The Aro Corporation, Bryan, Ohio, a corporation of Ohio
Filed Aug. 1, 1962, Ser. No. 214,093
7 Claims. (Cl. 264—4)

This invention relates to a method for encapsulating liquid particles in a polymerized shell formed in situ at the surface of the particles. Such capsules provide a convenient way of packaging a bifunctional reactant for any use which requires a protecting enclosure for individual quantities of the liquid. The invention finds one use in providing a rupturable protective shell around particles of liquid amines to permit the amine to be dispersed in a resin for which it is a hardener without danger of reaction until the shell is ruptured. The mixture can be sprayed through a nozzle in which the shells are ruptured. The resin and the amine then become intermixed and the resin hardens upon the deposition surface.

It has been proposed heretofore to capsulate catalysts of various types but none have been practical insofar as we are aware. It is essential that the protective shell be impenetrable by the resin and the contained catalyst so that no intermixing occurs until hardening is desired. The shell must be rupturable so that the amine will be released upon impact in a spray nozzle or the like. Only the surface of the catalyst should be polymerized since a maximum volume of unreacted material is desired for reaction with the resin upon rupture of the shell.

The present invention provides a method by which these desired characteristics are obtained in an efficient and practical manner. We have found that liquid particles of one bifunctional reactant may be discharged into a solvent solution of another bifunctional reactant which is capable of reacting quickly with the liquid particles to condense and form a polymer on the surface of the particle.

One reactant may be defined as a low molecular weight organic compound having two similar or dissimilar reactive groups selected from the group consisting of amino and amidino —NHR, wherein R is H or alkyl; phenolic —OH; and —SH. The second reactant is a low molecular weight organic compound having two reactive groups, each of which is capable of reacting with ethyl alcohol at room temperature thereby to yield a compound having two ester groups. For example, a diamine and a dicarboxylic acid halide will form a polymerized shell of polyamide resin on the surface of the amine droplet.

In a preferred form of the invention a diamine is dissolved in an aqueous solution. The presence of the water appears to inhibit the reaction with dicarboxylic acid halide and results in a very thin, regular shell of spherical configuration which ruptures without difficulty. The acid halide solution should preferably be of lesser specific gravity than the amine solution so that drops will "slide" through the air-liquid interface, and not flatten. The solvent for either bifunctional reactant should be essentially inert to the reactant which it carries.

Figure 2:
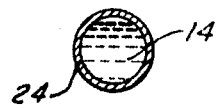

In the drawings:
FIGURE 1 illustrates schematically an apparatus suitable for practicing the method of the invention; and
FIGURE 2 is a cross sectional view through a capsule prepared in accordance with the invention.

*Example I*

The manner in which the invention may be practiced is illustrated in FIGURE 1 wherein a tube 10 having a small orifice 12 is illustrated. A 10% aqueous solution of triethylene tetramine catalyst is pumped into the tube 10 and droplets 14 are discharged from the orifice 12 into a vessel 16 located below the orifice. The orifice nozzle size and the pressure under which discharge takes place may be used to control the size of the droplets, which may for example range between 1 mm. and 10 mm. in diameter.

The vessel 16 contains two liquid layers 18 and 20 of different specific gravities. The liquid layer 18 may comprise a 5% sebacyl chloride solution in xylene, while the layer 20 may comprise a 5% sebacyl chloride solution in trichlorethylene. The two layers are partially miscible and form a broad boundary layer 22. The aqueous amine solution is immiscible with both solutions of acid chloride.

The droplets 14 of amine solution fall through the upper layer 18 due to their higher specific gravity and come to rest in the boundary layer 22 which is of the same or similar specific gravity as the droplets. The droplets 14 therefore remain suspended in the layer 22. The heavy solution 20 provides a cushion so that the drops do not strike the bottom of the vessel 16 and become misshapen. This is a problem where the vessel is shallow and the drops are expelled from the nozzle under pressure.

As the droplets 14 fall through the light layer 18, polymerization occurs at the surface of the droplets to form an encapsulating polyamide shell 24 about each droplet in less than one second. The capsule is shown in FIGURE 2 and has a shell thickness of about $\frac{1}{10}$ of the mean diameter. The polymerization reaction is well known and is described in detail in United States Patent No. 2,708,617. The droplets 14 with the encapsulating shell 24 are then removed from the vessel 16 by means of the porous-bottomed container 26. They may then be mixed with a complementary resin, such as an epoxy. The shell 24 prevents a premature reaction between the amine droplets 14 and the resin. When the shell 24 is ruptured as by spraying or brushing the resin having the droplets therein, a reaction occurs between the amine and resin which serves to cure the resin.

We have found that the amine may be capsulated in its pure state, i.e., without dissolving in water. However, the quality of the capsules prepared from the aqueous solution is superior. The latter are more regular in shape. The shell is thinner, harder, and more easily ruptured, but still impervious to the amine and the resin in which it is dispersed.

The success of the process is dependent in large part upon the immiscibility of the amine or amine solution in the acid halide solution. The liquids then have good surface tension against each other which results in the desired properties above mentioned.

*Example II*

The procedure of Example I was repeated using a single layer acid bath—the xylene-sebacyl chloride solution. We found, however, that it was necessary to increase the depth of the bath since the capsules of larger size sink and pile up on the bottom of the vessel and adhere to each other. By using a relatively long tube as a container for the bath, the polymer shell was more completely formed before striking the bottom. Thus adhesion of the capsules to each other was eliminated. Such apparatus can be operated continuously by removing capsules through a lock or equivalent means in the bottom of the container as they are formed. Good quality capsules were obtained.

Example III

The nozzle 12 was inserted through a rubber stopper disposed in an opening in the side of the container. The polymer-forming solution was of greater density than the amine solution and consisted of 5% sebacyl chloride in trichlorethylene. The amine was forced out of the nozzle continuously and the drops which formed rose to the surface of the bath, the shell forming on the way up. The capsules recovered from the surface were of good quality. In this apparatus the amine must move through the nozzle continuously or the resin formation will take place in the nozzle and plug it.

Example IV

The procedure of Example I was repeated except that a wetting agent was added to the xylene-acid solution. Nopco G813 was used although any good surface active agent miscible with the organic solvent is satisfactory. The wetting agent prevents splashing of the drops which improves their configuration. Further, in the case of very small drops which have little mass, there is a tendency for them to "hang up" at the surface which is eliminated by adding the wetting agent.

Capsules may be made using the following diamines in place of triethylene tetramine: ethylene diamine, triethylene diamine, ethyl diamine in admixture with bis-phenol A and ethylene oxide, 1,4-bis(aminomethyl) cyclohexane, bis - (4 - aminocyclohexyl)methane, m - phenylenediamine, piperazine (diethylenediamine), tetramethylenediamine, 2-hydroxy trimethylenediamine, propylenediamine and hexamethylene-diamine. Also, other dicarboxylic acid halides may be used, e.g., adipyl chloride, sebacyl chloride, isophthalyl chloride, 1,4-cyclohexenedicarbonyl chloride, 4-4'-biphenyldicarbonyl chloride, B-hydromuconyl chloride, terephthalyl chloride, oxalyl chloride, succinyl chloride, sulfonyl dibenzyl chloride, benzene disulfonyl chloride, diphenyl carbonyl chloride, phosgene, sulfuryl chloride, thionyl chloride, phosphoryl chloride and mixtures of these. The bifunctional reactants required to produce a polyamide shell are well known and are not at all critical insofar as the present invention is concerned. In the process of the invention the proportions are not critical since an excess of the amine is always present to complete the reaction. Other organic hydrocarbons such as aliphatic liquids are suitable for dissolving the acid chloride reactant.

Example V

The procedure of Example I was repeated by dropping a water solution of hexamethylene diamine into layers of xylene and trichlorethylene each containing 5% by weight of monoethylene glycol bis-chloroformate. The shell formed on the diamine in this case is a polyurethane resin (as distinguished from a polyamide in prior examples), comparable in quality to the polyamides.

The capsules made in accordance with each of the examples exhibited good stability when dispersed in epoxy resins and did not rupture in normal handling. The shelf life of the epoxy resins was good. Upon spraying or brushing the shells ruptured and the epoxy resin set up normally.

We have also found that the amine solution can be adjusted to provide a higher specific gravity by adding a filler such as barium sulfate or titanium dioxide. This is helpful in producing a final capsule which matches the resin in specific gravity and remains suspended in the liquid resin. It is also helpful in making the amine drops heavier than the acid solution into which they fall.

We claim:

1. Method for encapsulating a liquid bifunctional reactant capable of reacting with a second bifunctional reactant to form a polymer which method comprises (1) discharging drops of said liquid bifunctional reactant into a multi-layer bath with which said liquid bifunctional reactant is immiscible, and bath comprising solutions of said second bifunctional reactant including a first layer having a first specific gravity and a second layer having a second specific gravity greater than said first specific gravity, said liquid bifunctional reactant having a specific gravity greater than said first specific gravity and equal to or less than said second specific gravity, and (2) causing said drops to pass through said first layer and come to rest in a boundary layer between said first and second layers, whereby the external surface of said drops is converted to a polymerized protective shell.

2. Method of claim 1 wherein said liquid bifunctional reactant is a diamine.

3. Method of claim 2 in which said diamine is employed in an aqueous solution.

4. Method of claim 1 wherein said liquid bifunctional reactant is a diamine and said second bifunctional reactant is a dicarboxylic acid halide.

5. The method of claim 1 in which said drops are expelled from said nozzle under pressure.

6. Method of claim 1 in which said liquid bifunctional reactant is selected from the group consisting of amine and amidino —NHR, wherein R is H or alkyl; phenolic —OH, and —SH, and said second bifunctional reactant is a low molecular weight organic compound having two reactive groups each of which is capable of reacting with ethyl alcohol at room temperature to yield a compound having two ester groups.

7. Method of claim 4 wherein said dicarboxylic acid halide contains a wetting agent to facilitate passage of said drops through the air-liquid interface at the surface of said solvent solution.

References Cited by the Examiner

UNITED STATES PATENTS

| | | | |
|---|---|---|---|
| 2,492,861 | 12/1949 | Gunnel | 264—4 |
| 2,799,897 | 7/1957 | Jansen | 18—47.2 XR |
| 2,811,748 | 11/1957 | Smith | 264—13 |
| 2,938,233 | 5/1960 | Nack et al. | 264—7 |
| 2,969,330 | 1/1961 | Brynko | 264—4 |
| 3,063,949 | 11/1962 | Phillips et al. | |
| 3,065,188 | 11/1962 | Vandenberg. | |
| 3,167,602 | 1/1965 | Bentov | 264—4 |

ROBERT F. WHITE, *Primary Examiner.*

MORRIS LIEBMAN, *Examiner.*

C. B. HAMBURG, R. B. MOFFITT,

*Assistant Examiners.*